United States Patent [19]

Archambault et al.

[11] Patent Number: 5,632,521
[45] Date of Patent: May 27, 1997

[54] MOBILE SEAT FOR USE IN MOTORIZED VEHICLES

[75] Inventors: Marc-Antoine Archambault, Montréal; Philippe April; Pascal Octeau, both of St-Eustache; Viet Pham, Ville St-Laurent, all of Canada

[73] Assignee: Flexibülb Inc., Trois-Rivières, Canada

[21] Appl. No.: 497,423

[22] Filed: Jun. 30, 1995

[51] Int. Cl.⁶ .................. B60N 2/08; B60N 2/42
[52] U.S. Cl. ............ 296/65.1; 296/68.1; 297/344.1
[58] Field of Search .................. 296/65.1, 68.1; 297/344.1

[56] References Cited

U.S. PATENT DOCUMENTS 4,555,138  11/1985  Hughes .................. 296/65.1 X

FOREIGN PATENT DOCUMENTS 2635735  3/1990  France .................. 296/68.1

*Primary Examiner*—Andrew C. Pike

[57] ABSTRACT

A mobile seat is used in a motorized vehicle to permit a user person seated thereon to displace itself to a desired position and wherein the seat is locked and unlocked at the desired position by the user person in a hands-free mode. The seat comprises a seating member which is displaceably secured between front and rear guide rails. A pivot connection is provided rearwardly of the seating member. A braking element is connected to the seating member for displaceable engagement with the front guide rail by pivoting motion of the seat member about the pivot connection. The braking element is actuable by the position of the user person seated on the seating member whereby to arrest the seat member at a desired position without the use of the user person's hands.

22 Claims, 5 Drawing Sheets

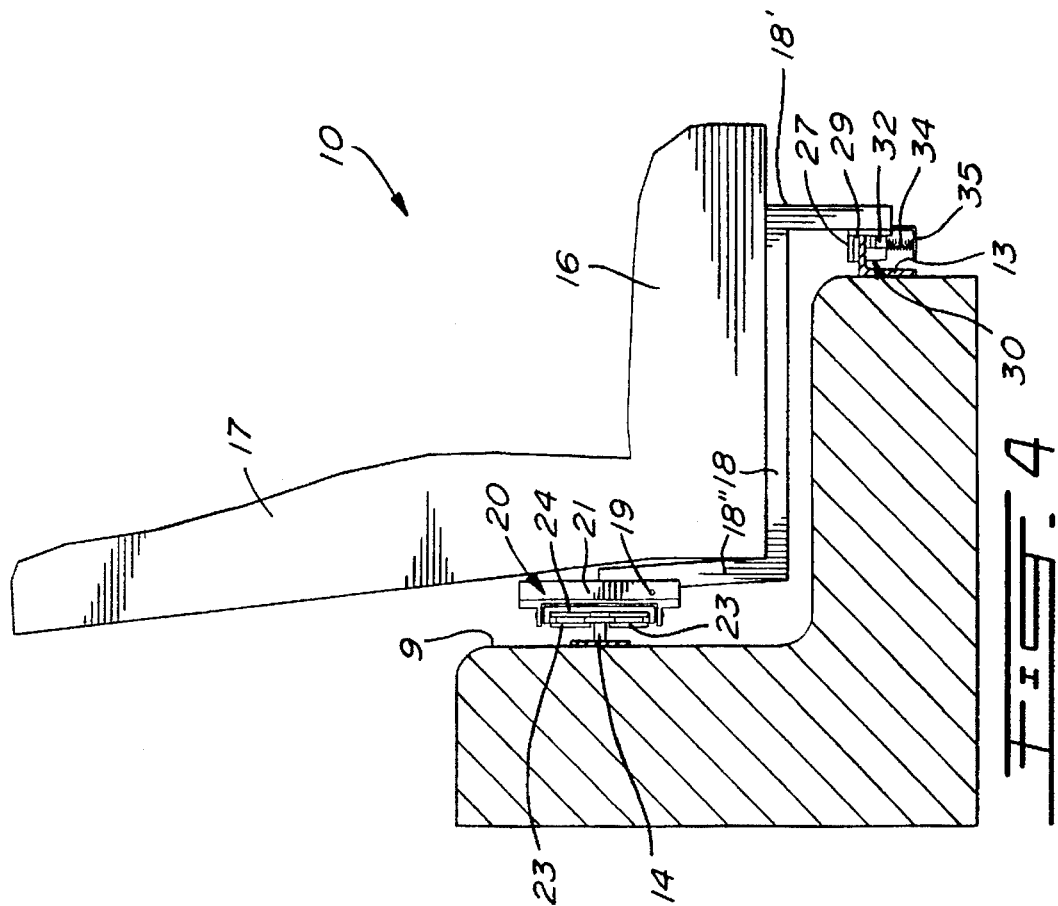
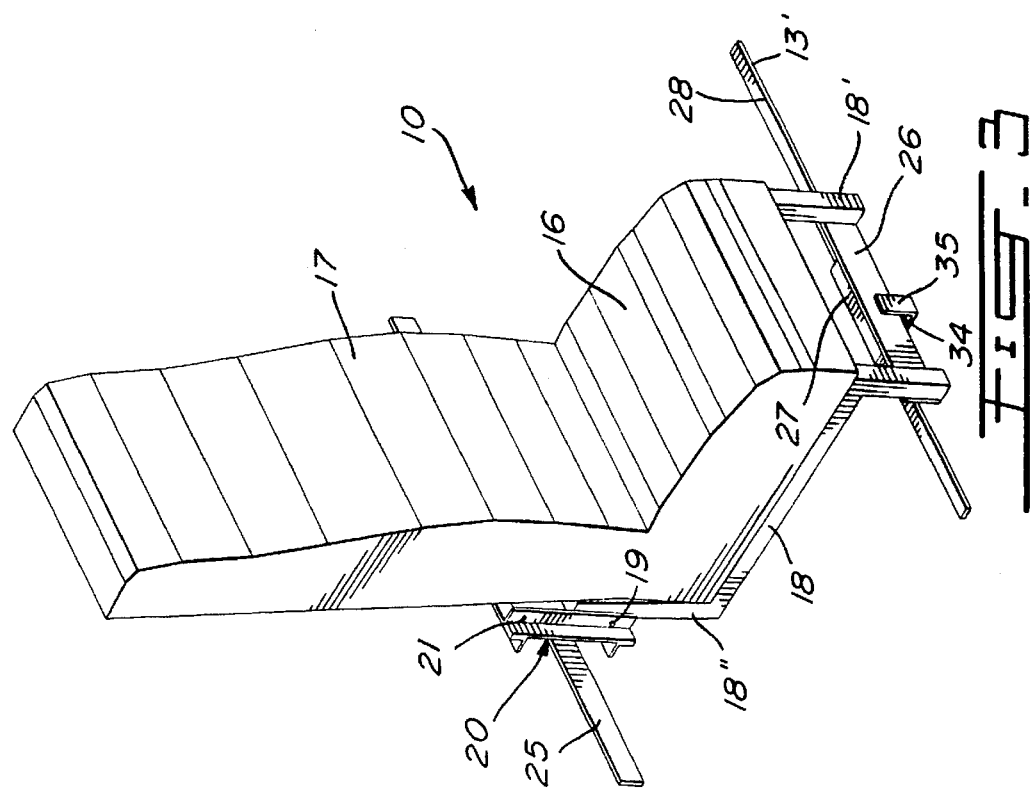

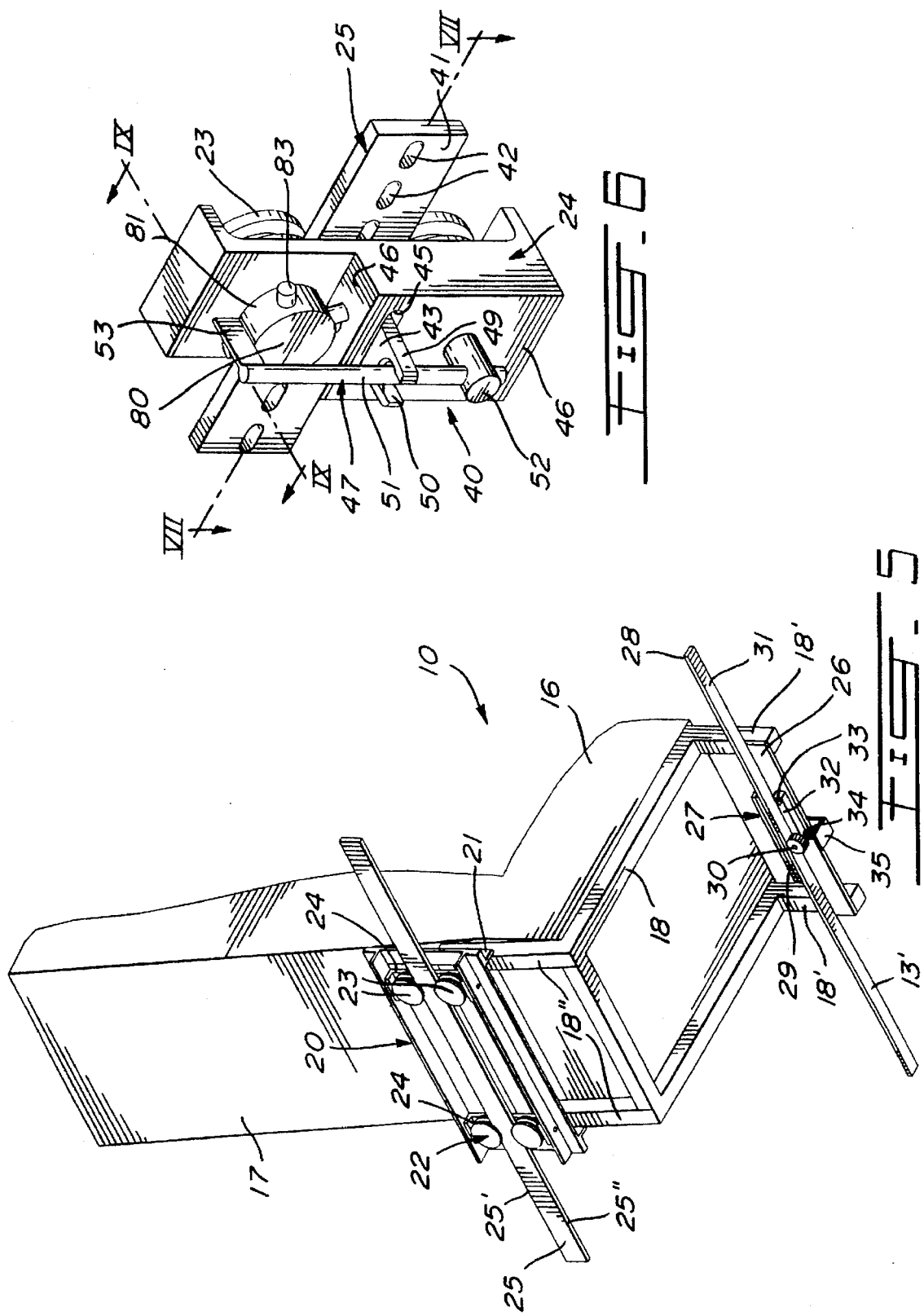

MOBILE SEAT FOR USE IN MOTORIZED VEHICLES

TECHNICAL FIELD

The present invention relates to a mobile seat for use in a motorized vehicle to permit a user person seated thereon to displace itself to a desired position and wherein the seat is locked and unlocked at the desired position by the user person in a hands-free mode such as to permit the user to perform another function with his hands.

BACKGROUND ART

Particularly, but not exclusively, the mobile seat of the present invention is for use in a motorized vehicle, such as an ambulance, helicopter, or other such vehicles which are subjected to abrupt movements capable of causing its occupants and the seat they are seated on to be thrown or displaced in a dangerous manner. It is known to provide a displaceable seat along a track of a rescue vehicle, such as an ambulance whereby the attendant can displace himself along a stretcher to attend to his patient while the vehicle is in motion. The attendant may be strapped to the seat and the patient is usually strapped to a stretcher which is connected to the floor of the vehicle. Such a system is, for example, described in German Patent DE 2641005 dated 1978. German Patent 2750406 also describes the construction of a displaceable chair secured to a rail and a caster to guide the seat and wherein the rail is provided with a belt connected to a coil at the end of the track to lock the seat in position. Accordingly, the seat can be locked in position regardless of sudden movement of the vehicle. French Patent 2635735 published on Mar. 2, 1990 also discloses a similar seat arrangement for securement in vehicles and wherein the seat may be locked to a desired position along a guide rail by means of a lever which is hand-operated by the user. In all of these publications, it is not permissible for the user person seated on the vehicle seat to displace himself in a hands-free mode while disconnecting and reconnecting a brake to immobilize the seat, and at its leisure, regardless of the comportment of the vehicle during transportation.

SUMMARY OF INVENTION

It is therefore a feature of the present invention to provide a mobile seat for use in a motorized vehicle and wherein the seat is displaceable along guide means and may be arrested by the user in a hands-free mode permitting the user to perform another function with his hands.

Another feature of the present invention is to provide a mobile seat for use in a motorized vehicle and wherein the seat is displaceable along a pair of guide rails and is arrested at a desired location by the weight of the body of the user.

Another feature of the present invention is to provide a mobile seat for use in a motorized vehicle and displaceable along a front and a rear guide rail and wherein a brake pad is provided in a front end portion of the seat and engageable with the front guide rail by the user seated in a forward bent position and disengageable by the user assuming a rear inclined position.

Another feature of the present invention is to provide a mobile seat for use in a motorized vehicle displaceable along a front and a rear guide rail and wherein an automatic locking device is associated with the rear guide rail to lock the seat thereon when the seat is subjected to a predetermined movement imparted thereto by the moving vehicle.

According to a still further broad aspect of the present invention there is provided a mobile seat for use in a motorized vehicle and displaceable along front and rear guide rails and wherein the seat is connected to a pivot connection to cause a rocking motion of the seat to engage and disengage a braking element secured under the seat and engageable with the front guide rail.

Another feature of the invention is to provide a mobile seat for use in a motorized vehicle, such as an ambulance, helicopter, military vehicle, or any other vehicle where it is necessary to displace a seat along a predetermined path and wherein the occupant of the seat is capable of displacing himself in a hands-free mode.

According to the above features, from a broad aspect, the present invention provides a mobile seat for use in a motorized vehicle to permit a user person seated thereon to displace itself to a desired position and wherein the seat is locked and unlocked at the desired position by the user person in a hands-free mode. The seat comprises a seating member displaceably secured between front and rear guide means. Pivot connection means is provided rearwardly of the seating member. Arresting means is connected to the seating member for displaceable engagement with the front guide means by pivoting motion of the seat member about the pivot connection means. The arresting means is actuable by the position of the user person seated on the seating member whereby to arrest the seat member at a desired position without the use of the user person's hands.

BRIEF DESCRIPTION OF DRAWINGS

A preferred embodiment of the present invention will now be described with reference to the accompanying drawings in which:

FIG. 3 is a perspective front view showing the mobile seat of the present invention and its securement to a front and rear guide rail;

FIG. 4 is a side section view showing the manner in which the mobile seat is secured to the front and rear guide rails and illustrating the construction of the arresting means under the front portion of the seat and the support carriage in the back of the seat and secured to the rear guide rail;

FIG. 5 is a rear perspective view further illustrating the manner in which the mobile seat is secured to the front and rear guide rails;

FIG. 6 is a perspective rear view showing the construction of a carriage together with an automatic locking device coupled thereto;

DESCRIPTION OF PREFERRED EMBODIMENTS

Figure 1:
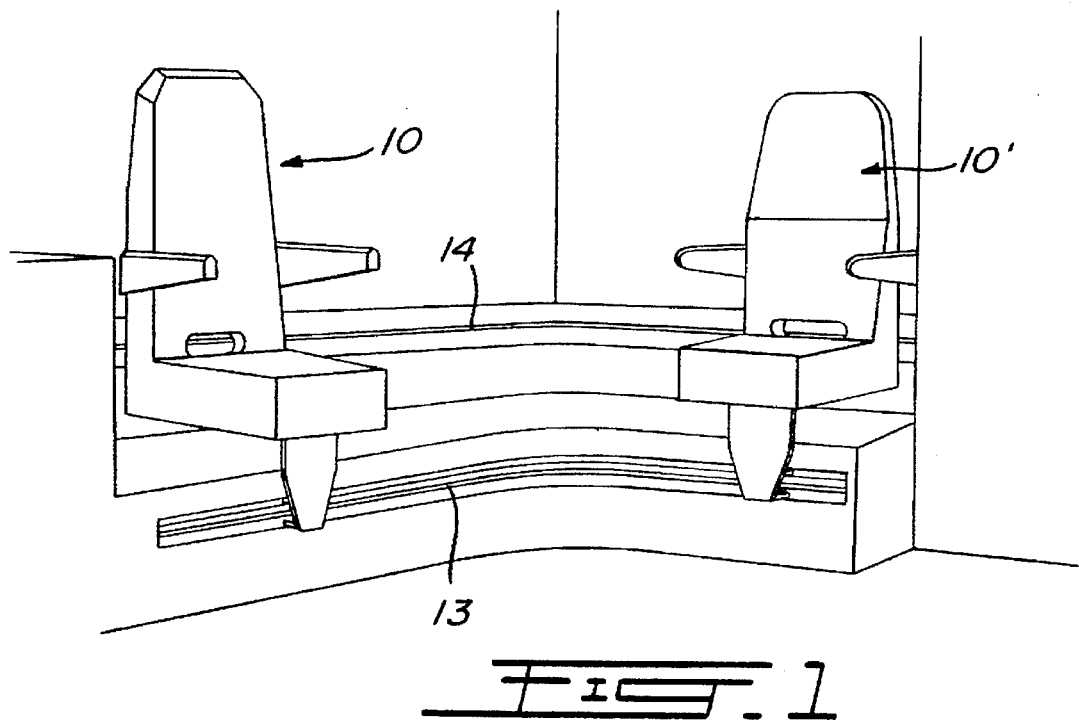
FIG. 1 is a perspective view showing a mobile seat displaceable along guide rails and constructed in accordance with the present invention to displace a user person to a desired position along the guide rails.
Figure 2:
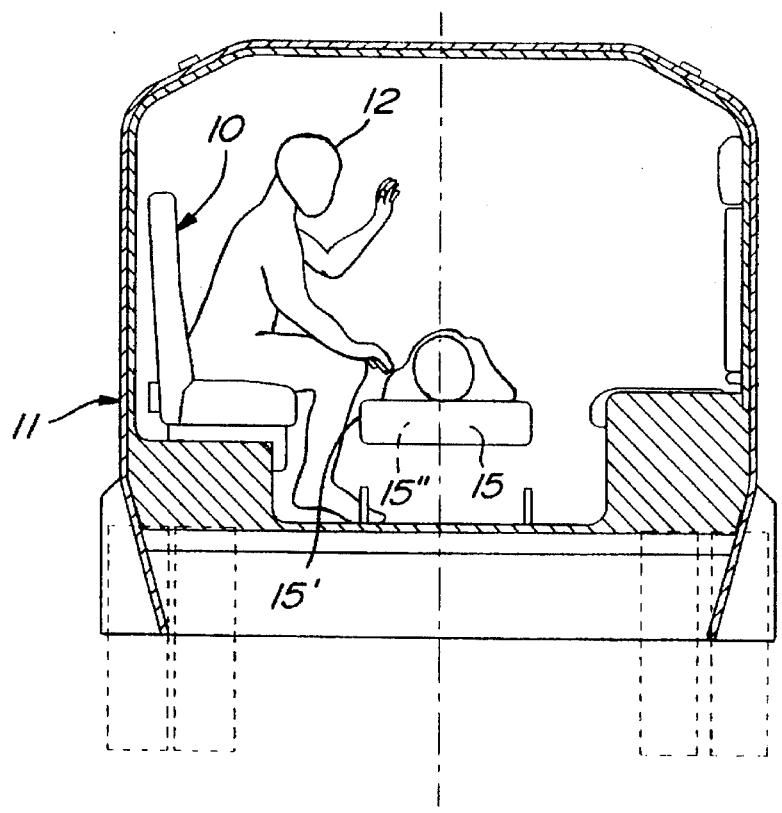
FIG. 2 is a simplified sectional view showing the seat of the present invention as secured to a motorized vehicle, such as an ambulance, and showing the position of the seat relative to a stretcher secured in the vehicle.

Referring now to the drawings and more particularly to FIGS. 1 and 2, there is shown generally at 10 the mobile seat of the present invention for use in a motorized vehicle 11 to permit a user person 12 (as shown in FIG. 2 only) seated on the seat 10 to displace itself to a desired position along the guide means, herein constituted by a front guide rail 13 and a rear guide rail 14. As shown in FIG. 1, the seat 10 may be displaceable intermediate end positions as shown at 10 and 10'. In one of its uses, the mobile seat 10 may be secured in a motorized vehicle 11, herein an ambulance, to permit an attendant person 12 to displace himself between a side 15' of a stretcher 15 to an end 15" of the stretcher to attend to a patient by the use of his two hands while the vehicle 11 is in motion.

Referring now to FIGS. 3, 4, and 5, there will be described the construction of the mobile seat and its attachment to the front and rear guide rails 13 and 14, respectively. As hereinshown, the seat is comprised of a seat portion 16 and a backrest portion 17. The seat portion 16 is secured to a seat support frame 18 which is pivotally connected by a pivot connection 19 to a carriage frame 20 in the rear of the backrest. The seat support frame 18 has a forwardly depending front frame portion 18' and an upwardly extending rear frame portion 18". The pivot connection 19 is in an upper section of the rear frame portion 18". Accordingly, the seat 10 is capable of a limited rocking motion when pressure is applied to the backrest portion 17 and the seat portion 16 by the attendant pushing against the backrest with his back.

As can be seen more clearly in FIG. 5, the carriage support frame 20 is a rectangular frame provided with a pair of end flanges 21 to which a pair of rear vertical posts 18" constituting the rear frame portion is pivotally secured by pivot pins 19. A pair of roller bearing sheaves 22 and 23 are secured spaced apart to a U-shaped support flange 24 and receives an elongated guide rail 25 captive therebetween. As hereinshown the sheaves of the pair of sheaves 22 and 23 are in rolling engagement with a respective one of opposed side edges 25' and 25" of the guide rail 25. The seat 10 is accordingly engaged by the guide rail 25 secured to a back wall 9 and displaceable therealong.

The front frame portion 18" is provided with a lower frame wall 26 and to which is secured an arresting means, herein a brake shoe 27. As hereinshown, the front guide rail 13 is an elongated flange having a horizontal wall 13' provided with a top, flat horizontal surface 28 which constitutes a braking surface and above which is aligned the brake shoe 27. As hereinshown the brake shoe 27 is an elongated flat bar having a lower flat brake pad 29 disposed in parallel relationship with the flat horizontal braking surface 28. Accordingly, when the person seated on the seat 16 moves his body forward, such as when taking care of a patient on the stretcher, he causes the seat to tilt forwardly with the brake pad 29 engaging on the horizontal surface 28 of the front rail 13' to arrest the seat from lateral displacement.

As can be seen more clearly from FIGS. 4 and 5, a spring-biased roller bearing 30 is also secured to the lower frame wall 26 and in opposed aligned relationship with the brake shoe 27. The roller bearing 30 engages the lower frame wall 26 during displacement of the seat. The roller bearing is in spring-biased contact with the bottom flat surface 31 of the elongated guide rail 13'. The roller bearing 30 is connected to a front end portion of a pivotal support arm 32 pivoted at one end by pivot connection 33. A helical spring 34 is held in compression between the pivotal support arm 32 and the support flange 35 connected to the lower frame wall 26. The support flange 35 permits limited pivoting motion of the seat member 10. When the seat portion 16 is tilted upwardly, the spring 34 will compress and the support flange 35 will restrict its upward motion. Alternatively, there could be a stopper element rearwardly of the backrest to engage the carriage frame 20 to effectuate this limited motion.

Summarizing the operation of the seat to displace it along the pair of parallel guide rails, the occupant when seated on the seat portion 16 causes the brake shoe 27 to engage with the top horizontal surface 28 of the front guide rail 13' making the seat immovable in lateral directions. Accordingly, the attendant can be performing a task with both his hands at a desired position with the seat secured and the attendant usually strapped to the seat by a safety belt or harness (not shown). In order for the attendant to displace himself along the rails it is necessary for him to lean backwards to apply pressure against the backrest 17 to cause the seat to tilt rearwardly on the pivot pin connection 19 causing the brake shoe to lift above the top horizontal surface of the front guide rail 13'. The flange 35 limits the upward tilting movement of the seat portion 16. The attendant can then, by using his feet and legs, cause the seat to shift sideways while still performing a task with his hands. This task could be that of taking care of a patient secured to a stretcher in front of him or it could be in another application the manipulation of controls on a control panel positioned in front of him, such as used in military vehicles or any other type vehicle such as an aircraft. When the attendant has displaced the seat to a desired position he then leans forward to cause the brake shoe 27 to engage itself.

Referring now to FIGS. 6 to 9 there will be described the construction and operation of an automatic locking mechanism 40 secured to the support flange 24 of the carriage mechanism whereby to further arrest the seat 10 when subjected to a predetermined abrupt lateral force imparted by abrupt movement or displacement of the vehicle and wherein the attendant may lose his footing. The automatic locking means 40 is integrated in the U-shaped support flange 24 of the carriage frame 20 and is therefore displaceable along the face 41 of the elongated guide rail 25 as the carriage is displaced therealong by displacement of the seat. A plurality of spaced-apart engageable arresting cavities 42 are provided in the face 41 of the guide rail 25 whereby to be engaged by a displaceable locking member 43, as better seen in FIG. 7.

Figure 7:
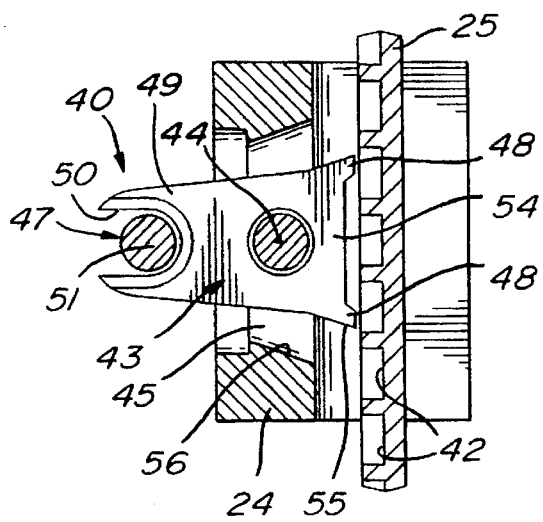
FIG. 7 is a simplified top transverse section view along cross section lines VII—VII of FIG. 6 illustrating the position of the locking head of the automatic locking device with respect to its associated guide rail.
Figure 8:
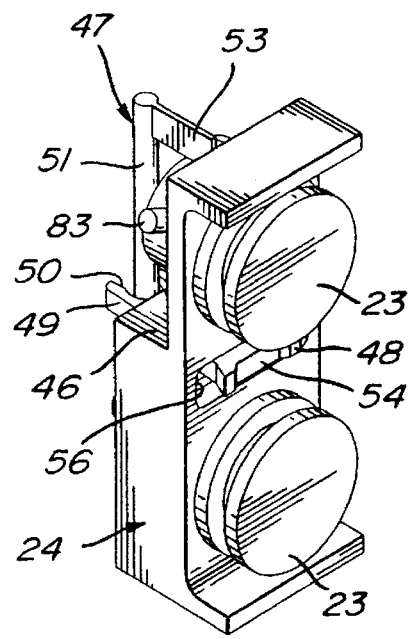
FIG. 8 is a front view in perspective of the carriage showing the locking device secured thereto.

The locking member 43 is pivotally secured on a pivot post 44 as is shown in FIG. 7 only, and secured across a slot 45 provided in an extension block 46 of the support flange 24. The locking member 43 is displaceable along a limited arc of that pivot post 44 by a lateral force responsive element 47 whereby the locking member can be positioned in engagement with one or more of the arresting cavities 42 when the seating member is subjected to abrupt lateral forces by displacement of the vehicle.

Figure 9:
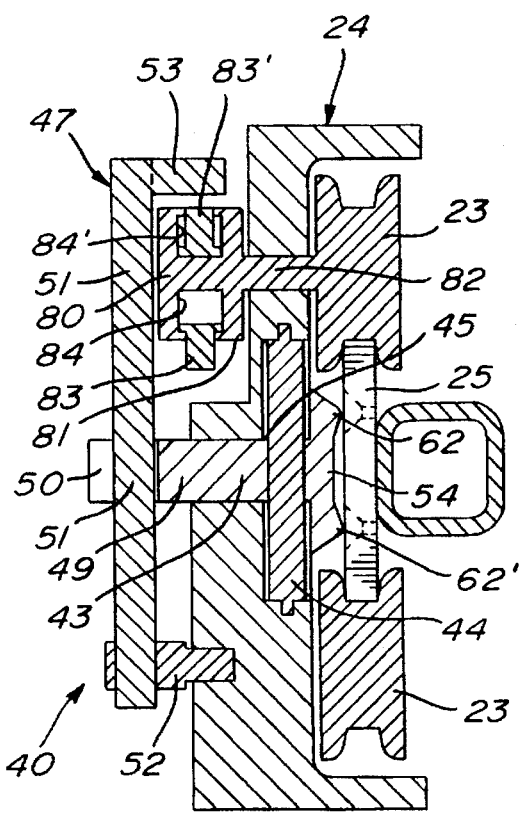
FIG. 9 is a cross-sectional view along cross section lines IX—IX of FIG. 6, showing the locking device and its relationship with respect to the carriage and the rear guide rail.
Figure 10:
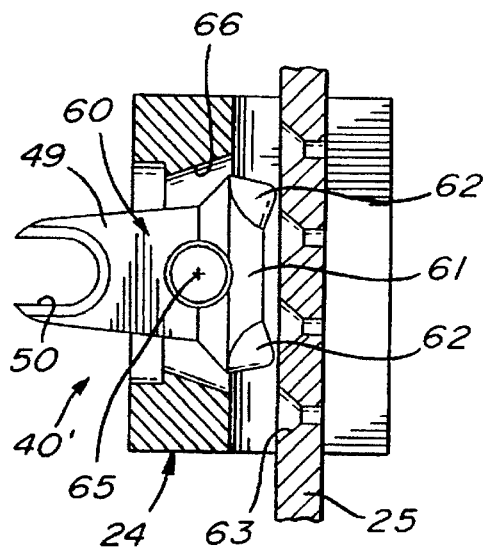
FIG. 10 is a simplified top transverse section view similar to FIG. 7 showing an alternative construction of the automatic locking device showing it in a disengaged position.

As can be seen in FIG. 7, the locking member 43 operates as a rocker arm and has a locking head 54 provided with a pair of spaced-apart engaging fingers 48. The opposed end of the rocker arm 43 is a lever end 49 provided with an open-ended U-shaped slot 50 through which the swing arm 51 of the lateral force responsive element 47 extends. A small clearance may be provided about the arm 51 whereby small displacements or vibrations of the swing arm 51 will not cause engagement of the fingers 48 within the arresting cavities 42. The bottom of the swing arm 51 is pivotally connected by a top pivot connection 52 secured to the support flange 24. A coupling member 53 is secured to a top end of the swing arm 51 and extends closely over a circumferential top wall 81 of an actuating wheel 80. The wheel 80, as shown in FIG. 9, is secured to the shaft 82 of the sheave 23 and rotates therewith as the seat is displaced along the guide rail 25. A plurality, herein four, radially displaceable actuating pins 83 are retained captive in respective cavities 84 formed about the circumferential top wall 81. As the seat is displaced along the rail by the user, the pins 83 move in and out of their respective cavities. When the pin is in its top position, as shown at 83', it falls within its cavity 84' and clears the coupling member 53. When the vehicle is subjected to impact or abrupt displacement such as when braking or quick acceleration, any rapid displacement of the sheave 23 will cause the pin at 83' to move out of its cavity and abut the coupling member 53 to move the arm 51 sideways on its pivot 52 and displace the locking member 43 on its pivot 44. Accordingly, the pins 83 are axially displaceable in their cavities by gravitational and centrifugal force as a result of abrupt movement.

As can be seen, the locking head of the rocker arm or locking member 43 is constructed as a fork end and when displaced on the pivot post, to either side thereof, it causes one of the fingers 48 to enter one of the cavities 42 while the side edge 55 of the locking member 43 will abut a shoulder 56 of the cavity 45. Accordingly, the locking member 43 is wedged between one of the cavities 42 and the support flange 24 and the seat is instantaneously arrested. As soon as the vehicle resumes its normal movement and the seat is shifted slightly, the engaged pin 83' will fall back in its cavity and the arm 51 will assume its position of rest and the locking member 43 will disengage. Accordingly, this wedging action is applied instantly during abrupt displacement of the vehicle such as quick acceleration, stopping, collisions, etc.

Figure 11:
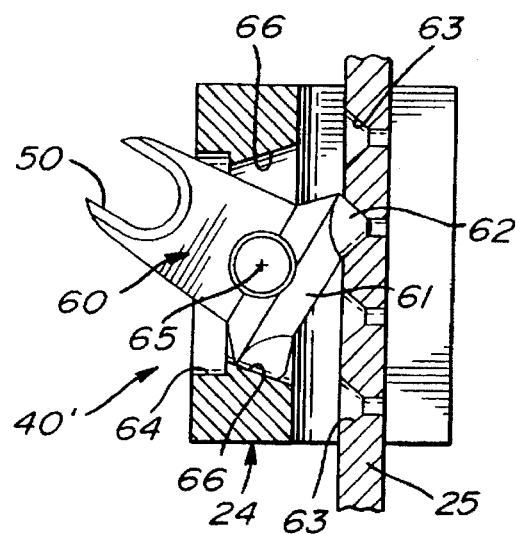
FIG. 11 is a view similar to FIG. 10 but showing the locking device in its engaged position.
Figure 12:
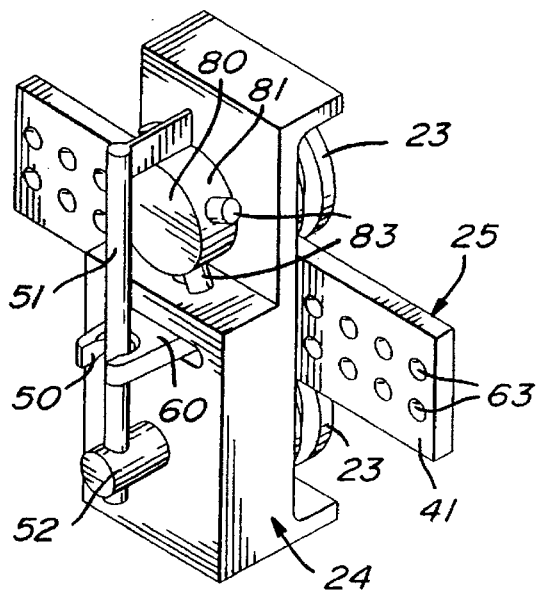
FIG. 12 is a rear perspective view showing the carriage and the locking device of FIGS. 10 and 11 associated with the rear guide rail having different locking cavities formed therein.
Figure 13:
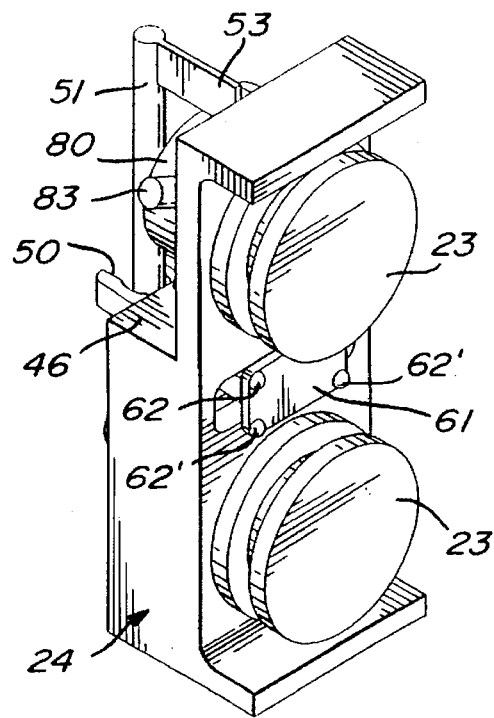
FIG. 13 is a front view in perspective of the carriage showing the automatic locking device of FIG. 10.

FIGS. 10 to 13 illustrate a further embodiment of the automatic locking mechanism 40, hereinshown as 40', and wherein the rocker arm 60 is provided with a different fork head 61 having opposed fingers 62. As hereinshown, the fork head is provided with two pairs of fingers 62 and 62' as shown more clearly in FIG. 9 and displaceable about a pivot connection 65 by the displacement of the swing arm 51 which extends through the slot 50 of the lever end 49 thereof. There are two rows of conical arresting cavities 63 formed in the face 41 of the guide rail 25. The cavity 64 provided in the support flange 24 has an angulated end wall section 66 whereby to receive in abutting relationship thereon a pair of fingers 62 and 62' when the other fingers are engaged within the conical-shaped cavity 63, as shown in FIG. 11. This construction of the locking member 60 provides for a stronger wedging action between the support flange 24 and the rail 25 and the conical shape of the fingers and the cavities provides for easier engagement and disengagement.

It is within the ambit of the present invention to cover any obvious modifications of the preferred embodiment described herein, provided such modifications fall within the scope of the appended claims.

We claim:
1. A mobile seat for use in a motorized vehicle to permit a user person seated thereon to displace itself to a desired position and wherein said seat is locked and unlocked at said desired position by said user person in a hands-free mode, said seat comprising a seating member displaceably secured between front and rear guide means, pivot connection means rearwardly of said seating member, and arresting means connected to said seating member for displaceable engagement with said front guide means by pivoting motion of said seating member about said pivot connection means, said arresting means being actuable by a position of said user person seated on said seating member whereby to arrest said seating member at said desired position without use of the user person's hands.

2. A mobile seat as claimed in claim 1 further comprising automatic locking means associated with said rear guide means to further arrest said seating member when said seating member is subjected to a predetermined abrupt force imparted thereto by the vehicle to which said seat is secured.

3. A mobile seat as claimed in claim 2 wherein said seating member has a seat portion and a backrest portion, said front guide means being disposed under a forward part of said seat portion, said rear guide means being disposed rearwardly of said backrest portion.

4. A mobile seat as claimed in claim 3 wherein said front and rear guide means are front and rear elongated guide rails disposed substantially parallel to one another, and said seat further comprises a carriage secured to said backrest portion and having roller bearing means in support engagement with said rear elongated guide rail for smooth support displacement of said seating member therealong.

5. A mobile seat as claimed in claim 4 wherein said automatic locking means is comprised of a support member immovably secured to said carriage and displaceable adjacent a face of said rear elongated guide rail as said carriage is displaced therealong, said face of said rear elongated guide rail having a plurality of spaced-apart engagement arresting cavities therealong, a displaceable locking member secured to said support member, and a force responsive means for moving said locking member in engagement with one or more of said arresting cavities when said seating member is subjected to said predetermined abrupt force.

6. A mobile seat as claimed in claim 5 wherein said displaceable locking member is a pivotally connected arresting rocker arm connected to said support member by a pivot connection, said arresting rocker arm having a locking head for engagement in said one or more of said arresting cavities, and a lever end for arcuately displacing said locking head about said pivot connection, said force responsive means being connected to said lever end.

7. A mobile seat as claimed in claim 6 wherein said force responsive means is a swing arm having a bottom pivot connection secured to said support member, and a coupling member at a top end of said swing arm, said swing arm being engageable with said lever end at an intermediate location thereof; and an actuating wheel is secured to a pivot shaft of one of said roller bearing means, said actuating wheel having impact responsive means to engage said coupling member when said actuating wheel is displaced as a result of said predetermined abrupt force to cause said displaceable locking member to pivot for engagement with said one or more of said arresting cavities.

8. A mobile seat as claimed in claim 7 wherein said lever end has a slot therein, said slot being dimensioned to receive said swing arm in spaced relationship therethrough to permit limited lateral displacement of said swing arm without causing said locking head to engage in said one or more said arresting cavities.

9. A mobile seat as claimed in claim 8 wherein said locking head is a fork head having two pairs of spaced locking fingers, one of said pairs of fingers engaging in an arresting cavity of two rows of said arresting cavities when said rocker arm is displaced through a predetermined arc about said pivot connection and another of said pairs of fingers abutting a shoulder of said support member to wedge said head between said rear elongated guide rail and said carriage.

10. A mobile seat as claimed in claim 8 wherein said locking head is a fork head having a pair of spaced locking fingers, one of said pair of locking fingers engaging in one of said arresting cavities when said rocker arm is displaced through a predetermined arc about said pivot connection to wedge said head between said rear elongated guide rail and a side portion of said rocker arm abutting said support member.

11. A mobile seat as claimed in claim 7 wherein said impact responsive means is comprised by at least two radially displaceable actuating pins retained captive in respective cavities formed spaced-apart in a circumferential top wall of said actuating wheel, said pins being displaceable axially in said cavities by gravitational and centrifugal forces.

12. A mobile seat as claimed in claim 1 wherein said seating member has a seat portion and a backrest portion, said front guide means being disposed under a forward part of said seat portion, said rear guide means being disposed rearwardly of said backrest portion.

13. A mobile seat as claimed in claim 12 wherein said front and rear guide means are front and rear elongated guide rails disposed substantially parallel to one another, and said seat further comprises a carriage secured to said backrest portion and having roller bearing means in support engagement with said rear elongated guide rail for smooth support displacement of said seating member therealong.

14. A mobile seat as claimed in claim 13 wherein said carriage is secured to a carriage frame, said seating member being secured to a seat support frame, said seat support frame being pivotally attached to said carriage frame by said pivot connection means to permit said pivoting motion of said seating member.

15. A mobile seat as claimed in claim 14 wherein said seat support frame has a pair of rear vertical posts each being pivotally connected by a pivot pin to a respective end flange of said carriage frame, said carriage frame having a pair of said roller bearing means arranged in a spaced-apart manner.

16. A mobile seat as claimed in claim 15 wherein said roller bearing means are each comprised by a pair of roller bearing sheaves disposed spaced apart and retained captive by opposed side edges of a projecting vertical support flange of said rear elongated guide rail with said sheaves in rolling engagement with a respective one of said opposed side edges.

17. A mobile seat as claimed in claim 12 wherein said front and rear guide means are connected to a vehicle cabin frame to displace said user person seated on said seat portion along a side and a head end of a stretcher disposed in said vehicle, said seat being displaced along said guide means by said user person while both hands of said user person may be used to attend to a patient on said stretcher.

18. A mobile seat as claimed in claim 17 wherein said motorized vehicle is an ambulance.

19. A mobile seat as claimed in claim 1 wherein said arresting means is a brake shoe secured to a forward portion of a seat support frame, said front guide means being an elongated guide rail secured to an immovable frame and having a top flat horizontal braking surface above which said brake shoe is displaceably positioned.

20. A mobile seat as claimed in claim 19 wherein said brake shoe is an elongated flat bar having a lower flat brake pad disposed in parallel relationship with said flat horizontal braking surface.

21. A mobile seat as claimed in claim 20 further comprising a spring-biased roller bearing also secured to said seat support frame in opposed aligned relationship with said brake shoe, said roller bearing being in spring-biased contact with a bottom flat surface of said elongated guide rail.

22. A mobile seat as claimed in claim 21 wherein said roller bearing is connected to a front end portion of a pivotal support arm pivotally connected to said forward portion of said seat support frame, and a helical spring is held in compression between said pivotal support arm and a support flange connected to said forward portion of said seat support frame, said support flange limiting said pivoting motion of said seating member.

* * * * *